United States Patent
Auman et al.

(10) Patent No.: US 6,469,126 B1
(45) Date of Patent: Oct. 22, 2002

(54) MELT-PROCESSIBLE, THERMOPLASTIC RANDOM COPOLYIMIDES HAVING RECOVERABLE CRYSTALLINITY AND ASSOCIATED PROCESSES

(75) Inventors: Brian C. Auman, Pickerington, OH (US); William R. Corcoran, Jr., Kennett Square, PA (US); John D. Summers, Chapel Hill, NC (US)

(73) Assignee: E. I. du Pont de Nmeours and Company, Wilmington, DE (US)

( * ) Notice: Subject to any disclaimer, the term of this patent is extended or adjusted under 35 U.S.C. 154(b) by 0 days.

(21) Appl. No.: 09/741,943

(22) Filed: Dec. 21, 2000

(51) Int. Cl.$^7$ .......................... C08G 73/10; C08G 69/26
(52) U.S. Cl. ....................... 528/170; 528/125; 528/128; 528/172; 528/173; 528/176; 528/183; 528/188; 528/220; 528/229; 528/350; 528/353
(58) Field of Search ................................ 528/125, 128, 528/170, 172, 173, 176, 183, 188, 220, 229, 350, 353

(56) References Cited

U.S. PATENT DOCUMENTS

| | | |
|---|---|---|
| 3,489,725 A | 1/1970 | Lucas |
| 3,803,085 A | 4/1974 | Takehoshi et al. |
| 4,073,773 A | 2/1978 | Banucci et al. |
| 4,281,100 A | 7/1981 | Takekoshi |
| 4,485,140 A | 11/1984 | Gannett et al. |
| 4,552,931 A | 11/1985 | St. Clair et al. |
| 4,837,300 A | 6/1989 | St. Clair et al. |
| 4,876,330 A | 10/1989 | Higashi et al. |
| 4,883,718 A | 11/1989 | Ohta et al. |
| 4,904,758 A | 2/1990 | Kunimune et al. |
| 4,923,968 A | 5/1990 | Kunimune et al. |
| 5,077,382 A | 12/1991 | Meterko et al. |
| 5,106,938 A | 4/1992 | Bookbinder et al. |
| 5,116,939 A | 5/1992 | Fletcher et al. |
| 5,145,937 A | 9/1992 | Hergenrother et al. |
| 5,166,308 A | 11/1992 | Kreuz et al. |
| 5,171,828 A | 12/1992 | Meterko et al. |
| 5,202,412 A | 4/1993 | Auman et al. |
| 5,219,977 A | 6/1993 | Kreuz |
| 5,260,388 A | 11/1993 | Tamai et al. |
| 5,268,446 A | 12/1993 | Tamai et al. |
| 5,268,447 A | 12/1993 | Tamai et al. |
| 5,298,331 A | 3/1994 | Kanakarajan et al. |
| 5,302,652 A | 4/1994 | Parish |
| 5,406,124 A | 4/1995 | Morita et al. |
| 5,411,765 A | 5/1995 | Kanakarajan et al. |
| 5,464,928 A | 11/1995 | Chang et al. |
| 5,478,913 A | 12/1995 | Boyce et al. |
| 5,478,916 A | 12/1995 | Chang et al. |
| 5,484,879 A | 1/1996 | Buchanan et al. |
| 5,502,157 A | 3/1996 | Chang et al. |
| 5,644,022 A | * 7/1997 | Jensen .................. 528/353 |
| 5,866,676 A | * 2/1999 | Jensen .................. 528/353 |

FOREIGN PATENT DOCUMENTS

| | | |
|---|---|---|
| EP | 0 154 720 A1 | 9/1985 |
| EP | 0 459 801 A2 | 12/1991 |

OTHER PUBLICATIONS

V. Ratta et al., "A Melt–Processable Semicrystalline Polyimide Structural Adhesive Based on 1,3–Bis(4–aminophenoxy) benzene and 3,3',4,4'–Biphenyltetracarboxylic Dianhydride," Polymer 40 (1999), pp. 1889–1902 (Publication of Virginia Polytechnic Institute and State University, Blacksburg, VA).

J. Jensen et al., "Adhesive and Composite Properties of LARC—8515 Polyimide," High Performance Polym. 7 (1995), pp. 11–21 (Publication of NASA Langley Research Center, Hampton, VA).

D. Heberer et al., "Crystallization and Morphology of Semicrystalline Polyimides," Macromolecules 24 (1991), pp. 1890–1898 (Publication of University of Akron, Institute and Department of Polymer Science).

B. C. Auman and C. A. Renner, "Polyimides Based on 2,2–Binaphthyl– and Biphenyl Ether Diamines," Polymer Preprints 35(2) (1994), pp. 747–748 (Publication of DuPont iTechnologies and SPEC CHEM).

M. J. Graham et al., "Effect of End Groups on the Thermal Stability of a Semicrystalline Polyimide," Polymer Preprints 38(1) (1997), pp. 306–307 (Publication of Virginia Polytechnic Institute and State University, Blacksburg, VA).

M. J. Graham et al., "Semicrystalline Polyimides Based on Ether Diamines," Polymer Preprints 37(1) (1996), pp. 487–488 (Publication of Virginia Polytechnic Institute and State University, Blacksburg, VA).

B. C. Auman and S. Trofimenko, "Soluble, Semi–regid and Quasi Rod–like Polyimides Based on a Novel Fluorinted Dianhydride," (Publication of DuPont iTechnologies).

R. G. Bryant, "A Soluble Copolyimide," Polymer Preprints 35(1) (1994), pp. 517–518 (Publication of NASA Langley Research Center, Hampton, VA).

B. J. Jensen et al., "Development of a Unique Copolyimide Backbone for Imide Oligomers with Terminal Reactive Groups," Polymer Preprints 35(1) (1994), pp. 539–540 (Joint publication of NASA Langley Research Center, Hampton, VA and College of William and Mary, Williamsbuirg, VA).

V. Ratta, A. Ayambem, J. E. Mc Grath, G. L. Wilkes, "Crystallization and multiple melting behavior of a new semicrystalline polyimide based on 1,3–bis(4–aminophenoxy)benzene (TPER) and 3,3',4,4'–biphenonetetracarboxylic dianhydride (BTDA)," *Polymer* 42 (2001), 6173–6186, Elsevier Science Ltd.

S. Tamai, T. Kuroki, A. Shibuya, A. Yamaguchi, "Synthesis and characterization of thermally stable semicrystalline polyimide based on 3,4'–oxydianiline and 3,3',4,4'–biphenyltetracarboxylic dianhydride, " *Polymer* 42 (2001), 2373–2378, Elsevier Science Ltd.

* cited by examiner

*Primary Examiner*—P. Hampton-Hightower

(57) ABSTRACT

Random, melt-processible copolyimides are disclosed herein. These copolyimides are semicrystalline and exhibit recoverable (semi)crystallinity from their melts. Associated processes, which entail either solution polymerization or melt polymerization, for producing and fabricating these copolyimides into useful articles having a predetermined shape are also disclosed.

23 Claims, 2 Drawing Sheets

MELT-PROCESSIBLE, THERMOPLASTIC RANDOM COPOLYIMIDES HAVING RECOVERABLE CRYSTALLINITY AND ASSOCIATED PROCESSES

FIELD OF THE INVENTION

This invention relates to selected copolyimide compositions each of which can be processed as a melt and which exhibit recoverable crystallinity upon cooling from the melt. In preferred embodiments, these copolyimide compositions can also be produced in a melt via melt polymerization.

BACKGROUND OF THE INVENTION

Polyimides constitute a class of valuable polymers being characterized by thermal stability, inert character, usual insolubility in even strong solvents, and high glass transition temperature ($T_g$) among others. Prior art discloses that their precursors have heretofore been polyamic acids, which may take the final imidized form either by thermal or chemical treatment.

Polyimides have always found a large number of applications requiring the aforementioned characteristics in numerous industries, and currently their applications continue to increase dramatically in electronic devices, especially as dielectrics.

Different aspects regarding polyimides and copolyimides may be found in a number of publications, such as for example:

Sroog, C. E., *J. Polymer Sci.:* Part C, No. 16 1191(1967).

Sroog, C. E., *J. Polymer Sci.: Macromolecular Reviews*, Vol. 11, 161 (1976).

*Polyimides*, edited by D. Wilson, H. D. Stenzenberger, and P. M. Hergenrother, Blackie, USA: Chapman and Hall, New York, 1990.

Several terms are defined below which are used in accordance with the present invention of high performance polyimides that possess simultaneously the following desirable properties: high thermal stability, such that they can be processed in the melt, and which exhibit recoverable semicrystallinity upon crystallization from the melt.

The term "melt-processible polyimide" means that the polyimide has sufficiently high thermoxidative stability and sufficiently low melt viscosity at temperatures at or above the melting point of the polyimide such that the polyimide can be processed in the melt to form a shaped object (e.g., extruded into a pellet, etc.) without the polyimide undergoing any significant degradation.

The term "melt-polymerizable polyimide" means that the polyimide can be formed in a melt in the absence of solvent by reaction of its respective monomers (e.g., dianhydride(s) and diamine(s)) to form initially polyamic acid(s), which are subsequently converted to the polyimide. Furthermore, the polyimide produced has sufficiently high thermoxidative stability and sufficiently low melt viscosity at temperatures at or above the melting point of the polyimide such that the polyimide can be processed in the melt to form a shaped object (e.g., extruded into a pellet, etc.) without the polyimide undergoing any significant degradation.

The term "DSC" is an acronym for differential scanning calorimetry, a thermal analysis technique widely used for accurately determining various thermal characteristics of samples, including melting point, crystallization point, and glass transition temperature. The acronym "DSC" is employed in text that follows below. The following definitions of slow, intermediate, and fast crystallization kinetics and related terms are based upon behavior of a given sample during DSC analysis under slow cooling, quench cooling, reheat, etc. scans during the DSC analysis (see infra for details).

The term "slow crystallization kinetics" means that the crystallization kinetics are such that, for a given copolyimide sample, the sample, when subjected to DSC analysis, essentially does not show any crystallization during slow cooling (i.e., cooling at 10° C./minute) from its melt but does exhibit a crystallization peak on subsequent reheat. Furthermore, no crystallization occurs upon quench cooling.

The term "intermediate crystallization kinetics" means that the crystallization kinetics are such that, for a given copolyimide sample, when subjected to DSC analysis, the sample exhibits some crystallization on slow cooling and furthermore does exhibit some crystallization on reheat after slow cooling. Furthermore, there is no strong evidence for crystallization occurring upon quench cooling.

The term "fast crystallization kinetics" means that the crystallization kinetics are such that, for a given copolyimide sample, when subjected to DSC analysis the sample does exhibit crystallization peaks in both slow and quench cooling and furthermore no observable crystallization peak is seen on subsequent reheat of a given sample following slow cooling. After quench cooling, there may be some crystallization exhibited on reheat.

The term "melt of a polymer" means the polymer exists as the melt in a liquid or substantially liquid state. If the polymer is crystalline or semicrystalline, a melt of the polymer is necessarily at a temperature greater than or equal to its melting point ($T_m$).

The term "recoverable semicrystallinity" and/or "recoverable crystallinity" refers to behavior occurring in a semicrystalline or crystalline polymer and specifically means that behavior that occurs when the polymer, upon heating to a temperature above its melting point and subsequent slow cooling to a temperature well below its melting point, exhibits a melting point in a reheat DSC scan. (If a melting point is not observed during the reheat DSC scan, the polymer does not exhibit recoverable crystallinity. The longer a sample is below $T_m$ but above $T_g$, the greater probability it has to crystallize.)

The term "semicrystalline polymer" means a polymer that exhibits at least some crystalline characteristics and is partially but not completely crystalline. Most or all known polymers having crystalline characteristics are semicrystalline, but not totally crystalline, since they also have at least some amorphous characteristics. (Hence the term crystalline polymer is technically a misnomer in most or all instances where it is used, but nevertheless is often used.)

The melt index of a polymer is defined to be the number of grams of polymer extruded at a specific temperature and load through a die of a specified length and diameter in a time period of ten minutes. Details of the geometry and test procedures are described in ASTM D1238. (ASTM= American Society for Testing and Materials).

Some significant advantages of melt processing of semicrystalline polyimides having recoverable crystallinity according to the invention include processing without a solvent such that tedious and costly solvent recycling is unnecessary and can be eliminated. High thermal stability is not only essential for processing in the melt at temperatures of greater than or equal to 350° C. but also is required for polyimides used in high temperature applications. Semicrystalline polyimides are often highly desirable in comparison to otherwise comparable polyimides that are amorphous, since the former in relation to the latter often exhibit superior properties, such as having better mechanical properties (e.g., especially higher modulus), capability for use at higher temperatures without property degradation (e.g., better solder resistance, modulus retention), higher solvent resistance, higher creep viscosities (e.g., lower tendencies for distortion of a film or other structure with time), and lower coefficients of thermal expansion.

In order for a semicrystalline polyimide to be considered melt-processable, the polyimide must possess a melting point below a temperature of about 385° C., which temperature is a practical limit for melt processing due to both equipment capabilities/limitations and to avoid any significant thermal degradation of the polyimide. Furthermore, the polyimide also must possess a sufficiently low melt viscosity (i.e., less than or equal to a maximum of about $10^8$ poise (which is equal to $10^7$ Pascal-seconds), but preferably $10^4$ poise (which is equal to $10^3$ Pascal-seconds), depending on polymer melt temperature and shear rates of the melt processing equipment). Copolymerization can be used to lower the melting temperature of a polymer (e.g., polyimide) but usually results in loss of crystallinity. Prior art compositions have been unable to achieve suitable reduction in the melting points ($T_m$s) of the copolymeric compositions while simultaneously maintaining substantial degrees of semi-crystallinity in the copolymeric compositions. In the compositions of this invention, both suitable melting temperatures and high degrees of semi-crystallinity are achieved by judicious choice of comonomers and their relative amounts in the compositions.

Polyimides that exhibit a melting point in an initial DSC heat scan and which are thereby attributed to have crystalline characteristics are disclosed in Kunimune, U.S. Pat. No. 4,923,968 to Chisso Corporation. While the copolyimides disclosed in this patent may be crystalline or semicrystalline until heated to temperatures above their melting points, the present inventors have not observed the copolyimides disclosed in this patent likely to exhibit recoverable crystallinity. Indeed these copolyimides are probably substantially amorphous when cooled from their melts. Furthermore, many of the copolyimides disclosed in this patent are not melt-processable, because they have melting points, molecular weights, and/or melt viscosities that are too high for melt-processibility. In addition, endcapping in order to moderate the polymerization and improve melt processibility is not taught.

The selected random copolyimides of this invention overcome the drawbacks of the prior art compositions in that these copolyimides possess simultaneously these key essential properties—high thermal stability, melt-processibility, and recoverable crystallinity. The copolyimides of this invention can therefore be processed in the melt to form articles, which may have a predetermined shape, such as extrudates, fibers, films, and molded products comprised of these semicrystalline copolyimides. In many cases, the copolyimides of this invention can also be produced in the melt (via melt-polymerization).

There is a significant long-felt need not met by the current state of polyimide art for high performance polyimides that possess high thermal stability, which can be processed in the melt (melt-processable), and which exhibit recoverable semicrystallinity upon crystallization from the melt. This invention provides a solution to this long-felt need. There is also a long-felt need not met by the current state of polyimide art for high performance polyimides that can be produced by melt polymerization of appropriate monomers in a melt. In many embodiments, this invention also provides a solution to this latter long-felt need.

SUMMARY OF THE INVENTION

In one embodiment, the invention is a melt-processible, thermoplastic copolyimide comprising the reaction product of components comprising:

(I) an aromatic dianhydride component consisting essentially of 3,3',4,4'-biphenyltetracarboxylic dianhydride (BPDA) and pyromellitic dianhydride (PMDA) in combination;

(II) an aromatic diamine component selected from the group consisting of 1,3-bis(4-aminophenoxy) benzene (APB-134); 3,4'-oxydianiline (3,4'-ODA); 3,4'-oxydianiline (3,4'-ODA) and 4,4'-oxydianiline (4,4'-ODA) in combination; 3,4'-oxydianiline (3,4'-ODA) and 1,4-diaminobenzene (PPD) in combination; 1,3-bis (4-aminophenoxy) benzene (APB-134) and 4,4'-oxydianiline (4,4'-ODA) in combination; and 1,3-bis (4-aminophenoxy) benzene (APB-134) and 1,4-diaminobenzene (PPD) in combination; and (III) an endcapping component; wherein the copolyimide has a stoichiometry in the range from 93% to 98%, has a molar ratio of 3,3',4,4'-biphenyltetracarboxylic dianhydride/pyromellitic dianhydride (BPDA/PMDA) of greater than or equal to 70/30 but less than or equal to 95/5, exhibits a melting point in the range of 330° C. to 385° C., and exhibits recoverable crystallinity as determined by differential scanning calorimetry analysis.

As used herein the term "stoichiometry", expressed as a percent, means total moles of dianhydride(s) in relation to total moles of diamine(s) that are incorporated in a given polyimide. If the total moles of dianhydride(s) equals the total moles of diamine(s), the stoichiometry is 100 percent. If these two numbers are not equal, either total diamine(s) or total dianhydride(s) is present in higher amount, and the stoichiometery in this case is expressed as the mole percentage of component(s) (diamine(s) or dianhydride(s)) present in lesser amount relative to that component(s) present in higher amount. As one example, if a polyimide sample is derived from incorporation of 0.98 mole of dianhydride(s) and 1.00 mole of diamine(s), the diamine(s) is present in higher amount and the stoichiometery is 98%.

As used herein the term "endcapping" refers to the monofunctional component(s) (agent(s)) including, but not limited to, phthalic anhydride, naphthalic anhydride, and aniline, which cap the copolyimides to moderate the polymerization and to enhance thermoplasticity of the final melt polymerized product. Endcapping is generally done to 100% such that total moles of anhydride functionality are equal to total moles of amine functionality. Phthalic anhydride and naphthalic anhydride are suitable endcapping components in those cases where diamines are present in greater molar amounts than are dianhydrides. Aniline is a suitable endcapping component in those cases where dianhydrides are present in greater molar amounts than are diamines. The percentage of endcapping component required to afford 100% endcapping is equal to twice the value of (1-stoichiometry) multipled by 100. As an example, for a 100% endcapped copolyimide with 95% stoichiometry (diamine in excess), the total moles of the endcapping agent must be 10 mole percent of the total moles of the diamines, i.e., 10 moles of the endcapping agent to 100 moles of the diamines.

A given melt-processible copolyimide of the invention can in most instances be obtained by melt-polymerization or, alternatively, in all instances by traditional solution polymerization techniques, the latter of which are well known in the art. The melt processing technique of the invention can be used to manufacture an article of predetermined shape.

In the melt polymerization technique, the method of the invention comprises the steps of:

(a) blending, to substantial homogeneity, components comprising:
  (I) 93 to 98 mole parts of an aromatic dianhydride component consisting essentially of 3,3',4,4'-biphenyltetracarboxylic dianhydride (BPDA) and pyromellitic dianhydride (PMDA) in combination;
  (II) 100 mole parts of an aromatic diamine component selected from the group consisting of 1,3-bis(4-aminophenoxy)benzene (APB-134),3,4'-oxydianiline (3,4'-ODA); 3,4'-oxydianiline (3,4'-ODA) and 4,4'-oxydianiline (4,4'-ODA) in combination; 3,4'-oxydianiline (3,4'-ODA) and 1,4-diaminobenzene (PPD) in combination; 1,3-bis(4-aminophenoxy)benzene (APB-134) and 4,4'-oxydianiline (4,4'-ODA) in combination; and 1,3-bis(4-aminophenoxy)benzene (APB-134) and 1,4-diaminobenzene (PPD) in combination; and
  (III) 4 to 14 mole parts of at least one endcapping component;
the components (I), (II) and (III) being in substantially solventless form and the blending step producing a substantially solventless component blend;
  the blending step being carried out at a temperature below the melting point of any of components (I), (II) and (III);
  the component (I) and (II) being present in the component blend in a molar ratio of (I):(II) from 0.93 to 0.98;
  the component (III) being present in the component blend in a molar ratio (III):(II) of 0.04 to 0.14;

(b) heating the substantially solventless component blend produced in step (a) to a predetermined melt processing temperature at which the (I) aromatic dianhydride component and the (II) aromatic diamine component are melted and will react to form a melt of a polyimide; the predetermined melt processing temperature being less than the temperature at which the polyimide melt chemically decomposes;

(c) mixing the component blend and the polyimide melt produced therefrom during the heating step (b);

(d) removing water of reaction from the component blend and the polyimide melt produced therefrom during the heating step (b);

(e) forming the polyimide melt into an article having predetermined shape; and (f) cooling the article having predetermined shape to ambient temperature;

wherein the aromatic dianhydride component has a molar ratio of 3,3',4,4'-biphenyltetracarboxylic dianhydride/pyromellitic dianhydride (BPDA/PMDA) of greater than or equal to 70/30 but less than or equal to 95/5, the polyimide exhibits a melting point in the range of 330° C. to 385° C., and the polyimide exhibits recoverable crystallinity as determined by DSC analysis.

DETAILED DESCRIPTION OF THE INVENTION

Figure 1:
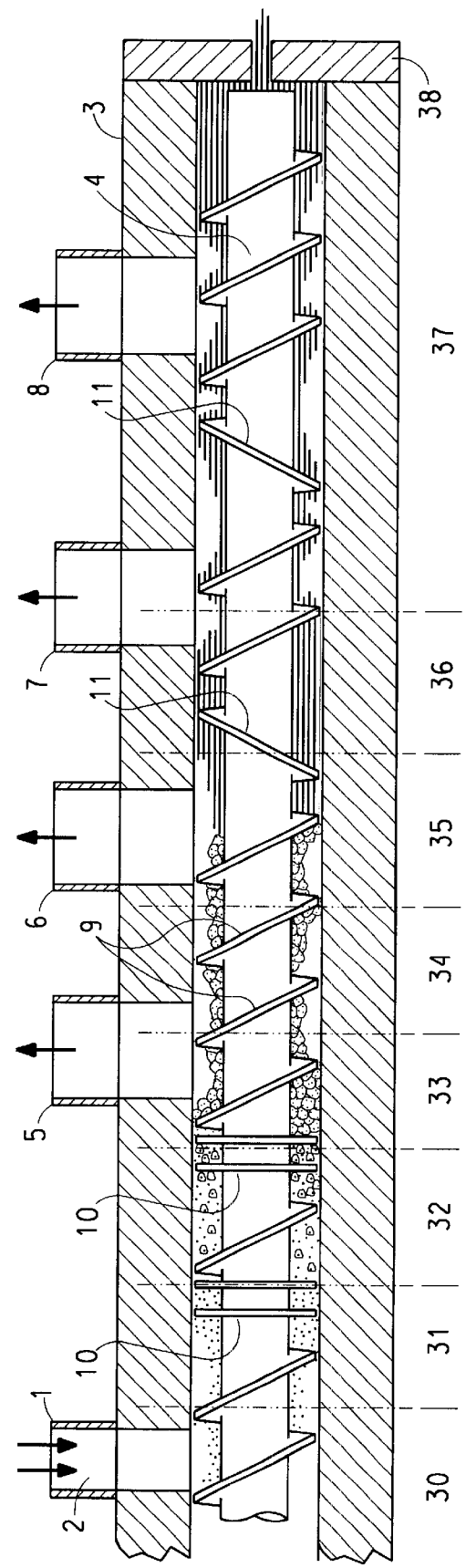
FIG. 1 is a side view drawing of a twin-screw extruder having a plurality of longitudinal barrel zones and vent port openings.

The melt-processible, thermoplastic copolyimides of this invention are the reaction products of components comprising an aromatic dianhydride component, an aromatic diamine component, and an endcapping component. The aromatic dianhydride component consists of BPDA and PMDA in combination. The aromatic diamine component is selected from the group consisting of APB-134; 3,4'-ODA; 3,4'-ODA and 4,4'-ODA in combination; 3,4'-ODA and PPD in combination; APB-134 and 4,4'-ODA in combination; and APB-134 and PPD in combination. Suitable endcapping components when diamine(s) is in excess include, but are not limited to, phthalic anhydride and naphthalic anhydride. A suitable endcapping component when dianhydride(s) is in excess includes, but is not limited to, aniline. A given copolyimide is produced by reaction of the dianhydride and diamine components as well as the endcapping component to form initially a poly(amic acid). Depending upon specific conditions, the poly(amic acid) can either be subsequently converted to polyimide (as is typical when the poly(amic acid) is formed in solution) or the poly(amic acid) can be essentially simultaneously further transformed to polyimide as it is being formed (as is typical under melt polymerization conditions).

The copolyimides of this invention are characterized to be semicrystalline, to exhibit recoverable crystallinity, and to possess all essential properties in order for them to be melt-processible. There is criticality of several parameters that define these copolyimides in order that they can possess all three of these key properties simultaneously. Critical parameters include choice of comonomers (e.g., dianhydride(s) and diamine(s)), amounts of different comonomers, and the stoichiometry of diamine(s) and dianhydride(s) in relation to one another. Endcapping is also an important consideration in order to improve molecular weight control and melt stability. With proper choices of these critical parameters, the copolyimides possess essential properties for melt-processibility, including melting points in the range of 330° C. to 385° C. and sufficiently low melt viscosities (i.e., less than about $10^8$ poise and preferably less than about $10^4$ poise) to permit melt processing. In addition, these copolyimides are semicrystalline and also exhibit recoverable crystallinity, i.e., these copolyimides can be crystalline or maintain their ability to crystallize when cooled below their melting points from their respective melts. The choice of comonomer(s) and their ratios for these copolyimides is particularly critical with respect to semicrystallinity and having recoverable crystallinity.

The stoichiometry of the inventive copolyimides is another critical parameter and must be in the range from 93% to 98%. Either dianhydrides or diamine(s) can be in excess, but preferably diamines are in excess and the copolyimides are capped with an endcapping agent (endcapping component). Suitable endcapping agents in cases where diamine(s) is in excess include, but are not limited to, phthalic anhydride and naphthalic anhydride (e.g., 2,3-naphthalic anhydride); phthalic anhydride is preferred (with diamines in excess). A suitable endcapping agent in cases where dianhydride(s) is in excess includes, but is not limited to, aniline. A copolyimide of this invention having stoichiometry higher than 98% will in general have too high a melt viscosity, while one having stoichiometry less than 93% will have poor mechanical properties, particularly toughness and flexural endurance. Stoichiometry will also impact at least to some extent the crystallization kinetics. Higher stoichiometry may generally translate to slower crystallization kinetics and to higher polymer viscosity (which results in lower polymer chain mobility).

Copolyimides of the invention contain BPDA as one dianhydride comonomer and they also contain PMDA as a second dianhydride. These copolyimides also contain an aromatic diamine component selected from the group consisting of APB-134; 3,4'-ODA; 3,4'-ODA and 4,4'-ODA in combination; 3,4'-ODA and PPD in combination; APB-134 and 4,4'-ODA in combination; and APB-134 and PPD in combination. For members of the (Markush) group that are single diamines, 3,4'-ODA is preferred, and for members of the (Markush) group that are two different diamines in combination, 3,4'-ODA and 4,4'-ODA in combination is preferred.

For copolyimides of this invention where the aromatic dianhydride component is BPDA and PMDA and the aromatic diamine component is APB-134, the molar ratio of BPDA/PMDA is in the range from 70/30 to 95/5. When the molar ratio of BPDA/PMDA is higher than 95/5, the copolyimides are not melt-processable because their melting points are too high. When the molar ratio of BPDA/PMDA is less than 70/30, the copolyimides exhibit lower degrees of recoverable crystallinity and may exhibit poor melt flow because of the appearance of a high melting phase due to significant PMDA/APB-134 sequence in the copolymer. Each of these copolyimides, wherein the molar ratio of BPDA/PMDA is in the range from 70/30 to 95/5, exhibits a crystallization peak upon cooling from a melt of the copolyimide in a cooling scan with cooling at 10° C./minute during DSC analysis. Crystallization peaks are observed in both second and third heat scans under the standard DSC testing protocol utilized (infra).

For copolyimides of this invention where the aromatic dianhydride component is BPDA and PMDA and the aromatic diamine component is 3,4'-ODA, the molar ratio of BPDA/PMDA is in the range from 70/30 to 95/5, preferably is in the range 75/25 to 90/10, and more preferably is in the range from 80/20, to 90/10. When the molar ratio of BPDA/PMDA is less than 70/30, the copolyimide has too low a level of crystallinity and/or may be amorphous and/or may exhibit poor melt flow because of the appearance of a high melting phase (due to significant PMDA/3,4'-ODA polymer). Furthermore, the melting point may also be too low, i.e. less than 330° C. When the molar ratio of BPDA/PMDA is greater than 95/5, the copolyimide is too high melting to be readily melt-processable.

For copolyimides of this invention where the aromatic dianhydride component is BPDA and PMDA and the aromatic diamine component is 3,4'-ODA and 4,4'-ODA in combination, i.e., both diamines are comonomers, the molar ratio of BPDA/PMDA is in the range from 70/30 to 95/5, and the molar ratio of 3,4'-ODA/4,4'-ODA is in the range from 75/25 to 95/5. Preferably, the molar ratio of BPDA/PMDA is greater than or equal to 75/25, and the molar ratio of 3,4'-ODA/4,4'-ODA is greater than or equal to 80/20.

For copolyimides of this invention where the aromatic dianhydride component is BPDA and PMDA and the aromatic diamine component is 3,4'-ODA and PPD in combination, i.e., both diamines are comonomers, the molar ratio of BPDA/PMDA is in the range from 70/30 to 95/5, preferably 75/25 to 90/10, and the molar ratio of 3,4'-ODA/PPD is in the range from 90/10 to 95/5.

For copolyimides of this invention where the aromatic dianhydride component is BPDA and PMDA and the aromatic diamine component is APB-134 and 4,4'-ODA in combination, the molar ratio of BPDA/PMDA is in the range from 70/30 to 95/5, and the APB-134/4,4'-ODA molar ratio is in the range from 85/15 to 95/5. Preferably, the molar ratio of BPDA/PMDA is in the range from 75/25 to 90/10, and more preferably is in the range from 80/20 to 90/10. When the molar ratio of BPDA/PMDA is greater than 95/5, the copolyimide has too high a melting point to be readily melt-processable. When the molar ratio of BPDA/PMDA is less than 70/30, the copolyimide has too low a degree of crystallinity or even may be amorphous or contain a high melting phase.

For copolyimides of this invention where the aromatic dianhydride component is BPDA and PMDA and the aromatic diamine component is APB-134 and PPD in combination, the molar ratio of BPDA/PMDA is in the range from 70/30 to 95/5, and the APB-134/PPD molar ratio is in the range from 90/10 to 95/5. Preferably, the molar ratio of BPDA/PMDA is in the range from 75/25 to 90/10, and more preferably is in the range from 80/20 to 90/10. When the molar ratio of BPDA/PMDA is greater than 95/5, the copolyimide has too high a melting point to be readily melt-processable. When the molar ratio of BPDA/PMDA is less than 70/30, the copolyimide has too low a degree of crystallinity or even may be amorphous or contain a high melting phase.

The melt-processible, semicrystalline copolyimides of this invention are typically produced by reaction between the aromatic dianhydride component, the aromatic diamine component, and the endcapping component. These reactions can be carried out in solution or in a melt. As an illustrative but non-limiting example, the aromatic dianhydride component can be BPDA and PMDA in combination, wherein the molar ratio of BPDA/PMDA is chosen to be greater than or equal to 70/30 but less than or equal to 95/5, the aromatic diamine component can be 3,4'-ODA and the endcapping component can be phthalic anhydride.

As illustrated in many textbooks and other references (e.g., for example, see *Polyimides*, edited by D. Wilson, H. D. Stenzenberger, and P. M. Hergenrother, Blackie, USA: Chapman and Hall, New York, 1990), reaction of a dianhydride(s) with a diamine(s) in solution initially affords a poly(amic acid). Typical, but non-limiting, reaction temperatures are ambient temperature to about 100° C. The poly(amic acid) that results can subsequently be converted to the corresponding polyimide (and water) by either heating the poly(amic acid) to elevated temperature(s) (e.g., about 250–400° C.) and/or subjecting the poly(amic acid) to chemical imidization using reagents such as triethylamine in combination with acetic anhydride. These are two step processes of obtaining a polyimide and require the removal of solvent for processing into usable forms such as thin films and sheet products.

Another method of forming a polyimide is to form it directly by blending and reacting comonomers (dianhydride (s) and diamine(s) and endcapping agent(s)) at elevated temperatures in the absence of a solvent. This method is melt polymerization. (Although the preferred method of melt polymerization utilizes dianhydride(s) as comonomer(s), tetracarboxylic acids and their derivatives (e.g., esters of tetracarboxylic acids) may also be suitable. In this case, the comonomers react under continually increasing reaction temperatures and form poly(amic acid) which is, within a short time interval, essentially completely converted to polyimide and water, such that there is in effect no substantial buildup of poly(amic acid) in the reaction mixture. This method can be conducted under batch or continuous conditions, with continuous conditions being preferred for high volume. Under preferred conditions, this method is conducted continuously with monomers being fed into an inlet end of a continuous reactor having increasing temperature zones and which is maintained at elevated temperatures above the melting point of the polyimide being produced and reaction occurs with removal of by-product water such that essentially pure polyimide as a melt exits at the other (exit) end of the continuous reactor. Upon exiting the reactor, one or more other unit operations can be performed on the melt of the polyimide which can afford a shaped object. These include, but are not limited to, casting the polyimide into a film, a fiber, a sheet, a tube, an extrudate strand that is cut into a pellet a coating on a wire, a compression-molded article, and a blow-molded article.

Additional Melt Polymerization Details

In some embodiments, this invention provides for a melt polymerization production of linear polyimides by reaction of certain aromatic diamines with certain aromatic dianhydrides, with an endcapping component also being present, at elevated temperature in the absence of any solvent. Melt polymerization, largely a solventless process, therefore produces thermoplastic polyimides without the need for solvents, as is required for current ones prepared by the classical solvent-based two-step approach or, in the case of soluble polyimides, by single stage high temperature solution polymerization using solvent/azeotroping agent systems. With the exclusion of BTDA, any inventive combination of monomers in any stoichiometry that yields a melt index greater than about three (3) at temperatures up to the decomposition temperature of the polymer is feasible for use in melt polymerization embodiments of this invention. An endcapping agent (component) optionally may be incorporated to moderate the polymerization and to enhance thermoplasticity of the final melt polymerized product.

Melt polymerization can be a batch process in a reactor, or a continuous process in an extruder or continuous mixer, or some combination to complete the melt polymerization in single pass or multiple passes. Polyimides made by either process may be amorphous, semicrystalline, and crystallizable compositions that are also melt processible, thus may be directly processed to yield a variety of useful shaped articles including films, coatings, tubing, adhesives, laminates, fibers, reinforced composites, tapes, molded parts and associated applications including electronic packaging, wire insulation and bearings. Or, the process may produce a resin in pellet form (also a shaped article) that can be secondarily processed into any or all of these same products at the same or alternate facilities. These pellets may be shipped, stored and handled much like any other polymer without the need for special requirements for some current intermediate polyimide solutions. This invention also yields a polyimide production process that is more environmentally friendly without the solvents and their handling, containment and recovery issues. And, the ability to melt this product also suggests the possibility of facile recycling, which is currently possible but very tedious and inconvenient.

A preferred melt polymerization process is a continuous one using an extruder, either twin-screw or single-screw, although a twin-screw with a plurality of longitudinal barrel zones is preferred. Suitable combinations (e.g., as disclosed elsewhere in the specification and/or as exemplified in the examples) of the aromatic diamine(s) with the aromatic dianhydride(s) are directly fed continuously into the extruder where they are melted, mixed and reacted to yield a molten polyimide. These ingredients may be fed into the extruder in one of several ways; individually with loss-in-weight feeders into a single feed point or at separate points, as a pre-blended single feed from either volumetric or loss-in-weight feeders, and/or some combination of partially pre-blended and individual ingredients in a single pass process. A multiple pass process to complete the melt polymerization is also possible. The extruder barrel zones are progressively increased in temperature to allow the reaction process to proceed in sequence until molten polymer flows freely out of the die. Extruder screws are designed to provide the necessary feed and melt conveying, melting and mixing (such as kneading blocks or mixers), and pumping to suit the process and residence time. Vent port openings along the way, combined with properly placed sealing elements (such as reverse flighted elements) in the screw to create partially filled zones at these vent ports, are employed to continuously remove the by-product water of reaction.

Figure 2:
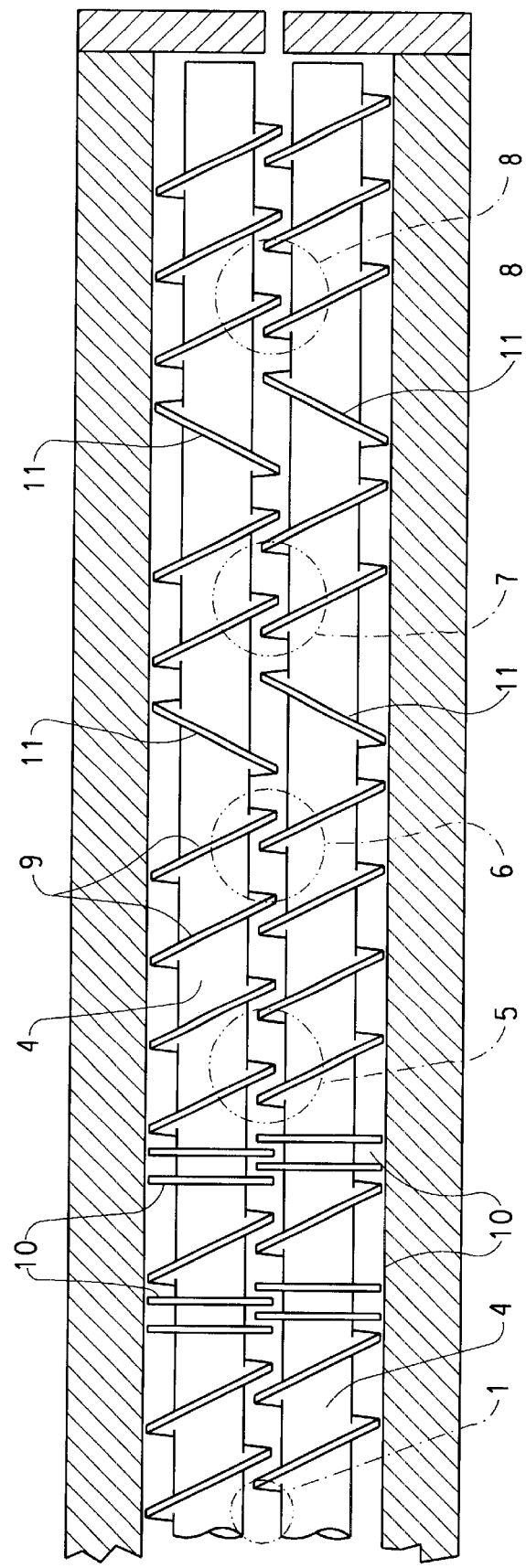
FIG. 2 is a plan view drawing of a twin-screw extruder.

Illustratively, FIG. 1 depicts in a side view schematically a typical twin-screw extruder having a plurality of longitudinal barrel zones and vent port openings that are set-up in one of several possible arrangements. FIG. 2 illustrates a plan view of the two screws 4 of the twin-screw extruder.

A general description of the reactive extrusion melt polymerization process of this invention is given immediately below (for an illustrative, non-limiting case of a continuous reaction in an extruder) and specific cases are exemplified in some examples. The monomers, kept under an inert atmosphere, are fed continuously at the prescribed rates and compositional ratios through a closed connection, 1, into an extruder feed port opening 2. Heating and cooling means (not shown) are provided along the barrel, 3, for controlling the various zones depicted in order to control the reaction process as it proceeds through the extruder. The extruder feed zone 30 is kept at or below room temperature, while the immediate adjacent zone 31 is generally below the lowest melting point of the various formulation ingredients, as low as 50° C., so as to avoid adversely impacting ingredient feed. The remaining zone temperatures are then progressively increased with increase in ascending zone number (as labeled in FIG. 1) to attain the melt polymerization temperature of the particular polyimide being formed and to achieve conveyance of the mixture through the remainder of the extruder zones and steady molten polymer flow through the die discharge. The zones maintained at elevated temperatures (except for zones 30 and 31) may range from as low as about 100° C. to as high as about 380° C. FIG. 1 illustrates an extruder having a feed zone 30 and seven additional zones (31–37). The temperature of die 38 during melt polymerization may be as high as 400° C., but is preferably maintained in the 340° C. to 380° C. range.

The extruder screws 4 are rotated at a rotation speed (measured as RPM) chosen to provide sufficient residence time to complete the reaction process of polyimide formation via melt polymerization. Extruder screw rotation speeds can range from as low as about 50 RPM to as high as about 500 RPM, although a rotation speed in the range from about 100 RPM to about 250 RPM is preferred. As is known to one skilled in the art of extrusion technology, optimal choice of extruder screw speed is also dependent on the screw element types and their positioning, as well as ingredient composition and throughput rates used, and these extruder screws are designed to provide the necessary feed and melt conveying, depicted as 9 in FIGS. 1 and 2, melting and mixing (such as kneading blocks or mixers, 10), and pumping to suit the process and residence time.

Vent port openings, (5, 6, 7 and 8 as illustrated in FIG. 1), along the length of the extruder are employed to continuously remove the substantial amount of water of reaction produced as a co-product in the melt polymerization process. This water is efficiently removed by continuous venting through several vent ports that are spaced along the extruder. Normally, at least two vent ports are required but there can be additional vent ports, i.e., four or even more can be employed. It has also been demonstrated that the first one or two ports removes the majority of the water of reaction at low vacuum, or even atmospheric pressure. The additional port(s) is preferably operated under vacuum to remove any additional water of reaction and/or bubbles that may be formed. Also, as is known to one skilled in the art of extrusion technology, there are special screw elements located immediately prior to these ports to completely fill the elements thereby creating a melt seal to limit the amount of polymer flow under the port to maximize the efficiency of water and/or bubble removal and to prevent plugging of the port. These include kneading blocks 10, or reverse flights as depicted as 11 in FIG. 2 which create back pressure on the polymer to fill the elements. Placement of the vent ports is determined by the formulation and throughput rates used relative to the screw elements and screw speed.

This process may be used to yield pre-determined shapes of a variety of useful articles including films, coatings, tubing, adhesives, laminates, fibers, reinforced composites, tapes, molded parts and associated applications including electronic packaging, wire insulation and bearings. Or, the process may produce a resin in pellet form that can be secondarily processed into any or all of these same products at the same or alternate facilities.

In most cases, the melt polymerization process of this invention is a first pass production process. Alternatively, the melt polymerization process can be a multiple step process, in which case the process is preferably two steps. In this latter case, the first step melt polymerization can yield a low molecular weight polymer. The second step involves melt polymerizing a mixture of this low molecular weight polymer with the addition of a sufficient amount of at least one other monomer to produce the desired stoichiometry and molecular weight. Conceptually, this second step can be directly coupled to the first melt polymerization device, or uncoupled and done off-line at a later time and/or another facility. This two-step process may be advantageous, and/or preferred, when that second step is used to produce a final product conducive to an extrusion type process, such as film, coated wires, tubing, and fiber.

GLOSSARY

Diamines

| | |
|---|---|
| APB-134 | 1,3-bis(4-aminophenoxy)benzene (= RODA) |
| RODA | 1,3-bis(4-aminophenoxy)benzene (= APB134) |
| 3,4'-ODA | 3,4'-oxydianiline |
| 4,4'-ODA | 4,4'-oxydianiline |
| PPD | 1,4-diaminobenzene |

Dianhydrides

| | |
|---|---|
| BPDA | 3,3',4,4'-biphenyltetracarboxylic dianhydride |
| PMDA | pyromellitic dianhydride |

General

| | |
|---|---|
| AA | Acetic anhydride |
| CTE | Coefficient of thermal expansion |
| DSC | Differential scanning calorimetry |
| hrs | hours |
| RPM | Revolutions per minutes |
| TEA | Triethylamine |
| g | gram |

-continued

| | |
|---|---|
| GPa | Gigapascals |
| GPC | Gel permeation chromatography |
| J/g | Joules per gram |
| MI | Melt Index (or melt flow index or melt flow rate) |
| $M_n$ | Number average molecular weight (determined by GPC unless otherwise indicated) |
| $M_w$ | Weight average molecular weight (determined by GPC unless otherwise indicated) |
| MPa | Megapascals |
| $T_g$ | Glass transition temperature (° C.) |
| $T_m$ | Melting point (° C. unless otherwise specified) |
| $T_c$ | Crystallization temperature (° C. unless otherwise specified) |

Polyimide

| | |
|---|---|
| M/N/O/P w/x/y/z | Polyimide that is reaction product of M at w parts, N at x parts, O at y parts, and P at z parts, where M, N, O, and P are monomers and all parts are mole parts (unless otherwise indicated) |

Solvents

| | |
|---|---|
| DMAC | N,N-dimethylacetamide |
| NMP | N-methyl-2-pyrollidinone |

SELECTED DIANHYDRIDE STRUCTURES

| Dianhydride | Dianhydride Structure |
|---|---|
| BPDA | |
| PMDA | |

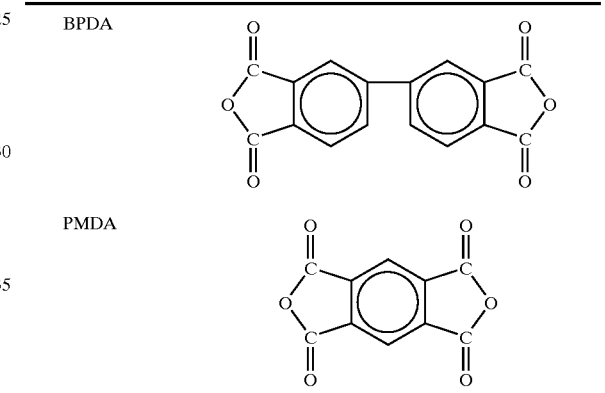

EXAMPLES

All percentages are mole percentages unless otherwise indicated. All parts are molar parts unless otherwise indicated. All ratios are molar ratios unless otherwise indicated. All temperatures are in degrees Centigrade (° C.) unless otherwise indicated. The phrase "a melt of a polyimide" is equivalent to the phrase "a polyimide melt".

A standard DSC testing protocol was utilized as indicated for specific examples. A description of this standard DSC testing protocol follows:

A given powder polyimide sample was subjected to DSC analysis to determine melting point, glass transition temperature, and crystallization. characteristics of the sample in relation to its structural characteristics. Unless otherwise indicated, the DSC analysis employed for each sample was that which follows:

An initial DSC analysis at 20° C./minute from ambient temperature to 500° C. was done to determine the appropriate upper temperature limit ($T_{ul}$) for the sample to be brought to during the multiple scan DSC analysis. This $T_{ul}$ was chosen to be below the temperature above which appreciable decomposition would occur, but above the temperature(s) of all significant transitions (melting, glass transition, etc.).

In each case, unless otherwise indicated a fresh sample was used in the multiple scan DSC, keeping the maximum temperature attained in the initial and second heat scans at or below $T_{ul}$. The multiple scan DSC analysis was run in the following manner:

1) An initial heat scan from ambient temperature to $T_{ul}$ at 10° C./minute.
2) A slow cool scan from $T_{ul}$ to ambient temperature at 10° C./minute.
3) A second heat scan from ambient temperature to $T_{ul}$ at 10° C./minute.
4) A quench cool scan from $T_{ul}$ to ambient temperature. (Quench cool scan was done by placing a dry ice dewar on top of the DSC cell to allow cooling at a fast but uncontrolled rate.)
5) A third heat scan from ambient temperature to 500° C. at 10° C./minute.

All DSC measurements were obtained on a DuPont 9900 DSC unit (E. I. du Pont de Nemours and Company, Wilmington, Del.). DuPont's former DSC business is now owned by TA Instruments, Wilmington, Del.

All of the melt index numbers reported or referenced herein were determined under a load of 8,400 grams at the specified temperature, i.e., either 350° C. or 375° C., and were conducted on a commercial automated melt index tester, or plastometer, a Tinius-Olsen Extrusion Plastometer Model MP-993.

Example 1

Preparation of Polyimide Based on BPDA/PMDA// 3,4'-ODA//PA 85.5/9.5//100//10 (All are Molar Parts)—(90/10 BPDA/PMDA Ratio)—(95% of Stoichiometric Dianhydride)

Into a 250 ml round bottom flask equipped with a mechanical stirrer and nitrogen purge were charged 8.2259 g of diamine 3,4'-ODA and 60 ml of NMP. After dissolution of the diamine, 10.3341 g of dianhydride BPDA, 0.8512 g of dianhydride PMDA, and 0.6085 g phthalic anhydride were added with stirring under nitrogen and rinsed in with 20 ml of NMP. The following day, 14.46 ml (0.153 mole) of acetic anhydride (4×moles of diamine) and 21.36 ml (1.53 mole) of triethylamine (4×moles of diamine) were added to the poly(amic acid) solution to effect imidization. After about 10 minutes the polymer precipitated, any clumps were broken up by manual manipulation with the mechanical stirrer, and stirring was continued for about 6 hrs. The resulting polymer slurry was then added to methanol in a blender to complete precipitation and remove NMP. The polymer was separated by filtration, washed with methanol, and then dried at ca. 200° C. overnight under vacuum with a nitrogen bleed. DSC analysis (10° C./min) of the resulting polyimide showed a melting point of 382° C. during the first heating scan, a crystallization exotherm upon the subsequent cooling at 290° C. and a melting point of 378° C. during the subsequent reheat indicating recoverable crystallinity from the melt.

Example 2

Preparation of Polyimide Based on BPDA/PMDA// 3,4'-ODA//PA 80.75/14.25//100//10 (All are Molar Parts)—(85/15 BPDA/PMDA Ratio)—(95% of Stoichiometric Dianhydride)

In a similar manner to Example 1, a polyimide was prepared with 9.8232 g BPDA, 1.2851 g PMDA, 8.2792 g 3,4'-ODA, and 0.6124 g phthalic anhydride. DSC analysis (10° C./min) of the resulting polyimide showed a melting point of 375° C. during the first heating scan, a crystallization exotherm upon the subsequent cooling at 294° C. and a melting point of 372° C. during the subsequent reheat indicating recoverable crystallinity from the melt.

Example 3

Preparation of Polyimide Based on BPDA/PMDA// 3,4'-ODA//PA 76/19//100//10 (All are Molar Parts)—(80/20 BPDA/PMDA Ratio)—(95% of Stoichiometric Dianhydride)

In a similar manner to Example 1, a polyimide was prepared with 9.3150 g BPDA, 1.7264 g PMDA, 8.3416 g 3,4'-ODA, and 0.6170 g phthalic anhydride. DSC analysis (10° C./min) of the resulting polyimide showed a melting point of 364° C. during the first heating scan, a crystallization exotherm upon the subsequent cooling at 289° C. and a melting point of 361° C. during the subsequent reheat indicating recoverable crystallinity from the melt.

Example 4

Preparation of Polyimide Based on BPDA/PMDA// 3,4'-ODA//PA 71.25/23.75//100//10 (All are Molar Parts)—(75/25 BPDA/PMDA Ratio)—(95% of Stoichiometric Dianhydride)

In a similar manner to Example 1 a polyimide was prepared with 8.7990 g BPDA, 2.1744 g PMDA, 8.4048 g 3,4'-ODA, and 0.6217 g phthalic anhydride. DSC analysis (10° C./min) of the resulting polyimide showed a melting point of 358° C. during the first heating scan, a crystallization exotherm upon the subsequent cooling at 290° C. and a melting point of 351° C. during the subsequent reheat indicating recoverable crystallinity from the melt.

Example 5

Preparation of Polyimide Based on BPDA/PMDA// 3,4'-ODA//PA 66.5/28.51/100//10 (All are Molar Parts)—(70/30 BPDA/PMDA Ratio)—(95% of Stoichiometric Dianhydride)

In a similar manner to Example 1, a polyimide was prepared with 8.2752 g BPDA, 2.6292 g PMDA, 8.4691 g 3,4'-ODA, and 0.6265 g phthalic anhydride. DSC analysis (10° C./min) of the resulting polyimide showed a melting point of 353° C. during the first heating scan, a crystallization exotherm upon the subsequent cooling at 232° C. and a melting point of 345° C. during the subsequent reheat indicating recoverable crystallinity from the melt.

Example 6

Preparation of Polyimide Based on BPDA/PMDA// 3,4'-ODA/PPD//PA 85.5/9.5//90/10//10 (All are Molar Parts)—(90/10 BPDA/PMDA Ratio)—(95% of Stoichiometric Dianhydride)

In a similar manner to Example 1, a polyimide was prepared with 10.5334 g BPDA, 0.8677 g PMDA, 7.5461 g 3,4'-ODA, 0.4528 g PPD, and 0.6202 g phthalic anhydride. DSC analysis (10° C./min) of the resulting polyimide showed a melting point of 383° C. during the first heating scan, a crystallization exotherm upon the subsequent cooling at 299° C. and a melting point of 382° C. during the subsequent reheat indicating recoverable crystallinity from the melt.

Example 7

Preparation of Polyimide Based on BPDA/PMDA// 3,4'-ODA/MPD//PA 85.5/9.5//95/5//10 (All are Molar Parts)—(90/10 BPDA/PMDA Ratio)—(95% of Stoichiometric Dianhydride)

In a similar manner to Example 1, a polyimide was prepared with 10.4223 g BPDA, 0.8585 g PMDA, 7.8813 g 3,4'-ODA, 0.2240 g MPD, and 0.6137 g phthalic anhydride. DSC analysis (10° C./min) of the resulting polyimide showed a melting point of 367° C. during the first heating scan, a crystallization exotherm upon the subsequent cooling at 284° C. and a melting point of 365° C. during the subsequent reheat indicating recoverable crystallinity from the melt.

Example 8

Preparation of Polyimide Based on BPDA/PMDA// 3,4'-ODA/4,4'-ODA//PA 85.5/9.5//90/10//10 (All are Molar Parts)—(90/10 BPDA/PMDA Ratio)—(95% of Stoichiometric Dianhydride)

In a similar manner to Example 1, a polyimide was prepared with 10.3239 g BPDA, 0.8504 g PMDA, 7.3961 g 3,4'-ODA, 0.8218 g 4,4'-ODA, and 0.6079 g phthalic anhydride. DSC analysis (10° C./min) of the resulting polyimide showed a melting point of 372° C. during the first heating scan, a crystallization exotherm upon the subsequent cooling at 310° C. and a melting point of 371° C. during the subsequent reheat indicating recoverable crystallinity from the melt.

Example 9

Preparation of Polyimide Based on BPDA/PMDA// 3,4'-ODA/4,4'-ODA//PA 85.5/9.5//80/20//10 (All are Molar Parts)—(90/10 BPDA/PMDA Ratio)—(95% of Stoichiometric Dianhydride)

In a similar manner to Example 1, a polyimide was prepared with 10.3239 g BPDA, 0.8504 g PMDA, 6.5743 g 3,4'-ODA, 1.6436 g 4,4'-ODA, and 0.6079 g phthalic anhydride. DSC analysis (10° C./min) of the resulting polyimide showed a melting point of 367° C. during the first heating scan, a crystallization exotherm upon the subsequent cooling at 330° C. and a melting point of 366° C. during the subsequent reheat indicating recoverable crystallinity from the melt.

Example 10

Preparation of Polyimide Based on BPDA/PMDA// 3,4'-ODA/4,4'-ODA//PA 80.75/14.25//90/10//10 (All are Molar Parts)—(85/15 BPDA/PMDA Ratio)— (95% of Stoichiometric Dianhydride)

In a similar manner to Example 1, a polyimide was prepared with 9.8232 g BPDA, 1.2851 g PMDA, 7.4513 g 3,4'-ODA, 0.8279 g 4,4'-ODA, and 0.6124 g phthalic anhydride. DSC analysis (10° C./min) of the resulting polyimide showed a melting point of 367° C. during the first heating scan, a crystallization exotherm upon the subsequent cooling at 298° C. and a melting point of 361° C. during the subsequent reheat indicating recoverable crystallinity from the melt.

Example 11

Preparation of Polyimide Based on BPDA/PMDA// 3,4'-ODA/4,4'-ODA//PA 80.75/14.25//80/20//10 (All are Molar Parts)—(85/15 BPDA/PMDA Ratio)— (95% of Stoichiometric Dianhydride)

In a similar manner to Example 1, a polyimide was prepared with 9.8232 g BPDA, 1.2851 g PMDA, 6.6234 g 3,4'-ODA, 1.6558 g 4,4'-ODA, and 0.6124 g phthalic anhydride. DSC analysis (10° C./min) of the resulting polyimide showed a melting point of 364° C. during the first heating scan, a crystallization exotherm upon the subsequent cooling at 335° C. and a melting point of 362° C. during the subsequent reheat indicating recoverable crystallinity from the melt.

Example 12

Preparation of Polyimide Based on BPDA/PMDA// 3,4'-ODA/4,4'-ODA//PA 76/19//90/10//10 (All are Molar Parts)—(80/20 BPDA/PMDA Ratio)—(95% of Stoichiometric Dianhydride)

In a similar manner to Example 1, a polyimide was prepared with 9.3150 g BPDA, 1.7264 g PMDA, 7.5074 g 3,4'-ODA, 0.8342 g 4,4'-ODA, and 0.6170 g phthalic anhydride. DSC analysis (10° C./min) of the resulting polyimide showed a melting point of 363° C. during the first heating scan, a crystallization exotherm upon the subsequent cooling at 320° C. and a melting point of 362° C. during the subsequent reheat indicating recoverable crystallinity from the melt.

Example 13

Preparation of Polyimide Based on BPDA/PMDA// 3,4'-ODA/4,4'-ODA//PA 71.25/23.75//90/10//10 (All are Molar Parts)—(75/25 BPDA/PMDA Ratio)— (95% of Stoichiometric Dianhydride)

In a similar manner to Example 1, a polyimide was prepared with 8.7990 g BPDA, 2.1744 g PMDA, 7.5644 g 3,4'-ODA, 0.8405 g 4,4'-ODA, and 0.6217 g phthalic anhydride. DSC analysis (10° C./min) of the resulting polyimide showed a melting point of 350° C. during the first heating scan, a crystallization exotherm upon the subsequent cooling at 307° C. and a melting point of 350° C. during the subsequent reheat indicating recoverable crystallinity from the melt.

Example 14 (Comparative)

Preparation of the Polyimide Based on BPDA//3,4'-ODA//PA 93//100//14 (All are Molar Parts)—(93% of Stoichiometric Dianhydride)

The diamine (3,4'-ODA), dianhydride (BPDA) and phthalic anhydride were weighed directly into a 3 liter nitrogen purged resin kettle in the amounts listed in the table below. The resin kettle was then fitted with a three neck cover, an overhead mechanical stirring system (Cole-Palmer Master Servodyne electric drive with a 50:1 gear ratio and a Hastelloy mixing blade) and nitrogen purge. The apparatus was assembled and the finely powdered monomers were mixed in the vessel for one hour at room temperature under inert gas purge.

To initiate melt polymerization, the kettle was lowered, via hydraulic lab jack, into a liquid metal bath (Patriot Alloys, Alloy-281) preheated to 280° C. by a 220 volt band heater. The following thermal schedule (bath temperature) was followed during the polymerization:

| TIME (MIN) | TEMPERATURE (° C.) |
|---|---|
| 0 | 280 |
| 0–26 | 280–400 |
| 26–44 | 400 |
| 44–64 | 400–425 |
| 64–75 | 425 |

Polymerization was observed to proceed upon melting of the monomers and the water of imidization was conveniently removed from the reactor via inert gas purge. Melt viscosity increased dramatically during the course of the polymerization. Total polymerization time was 75 minutes. At the conclusion of the polymerization, the heat source was removed and the viscous polymer was manually discharged from the reaction vessel and allowed to cool to room temperature. The polymer exhibited a $T_g$=244° C., $T_c$=262° C. $\Delta H_c$=23 J/g, $T_m$=391° C. $\Delta Hm$=27 J/g by DSC analysis (10° C./min.).

| Monomers | Abbreviation | Amount (g) | Moles |
|---|---|---|---|
| 3,4'-oxydianiline | (3,4'-ODA) | 320.38 | 1.600 |
| 3,3',4,4'-biphenyl tetracarboxylic dianhydride | (BPDA) | 437.77 | 1.488 |
| Phrhalic Anhydride | (PA) | 33.18 | 0.224 |

The observed melting point (391° C.) is too high for this copolyimide to be a viable melt-processible/melt-polymerizable candidate—hence this is a comparative example.

Example 15 (Comparative)

Preparation of Polyimide Based on BPDA/APB-134/PA 98/100/4 (All are Molar Parts) 98% of Stoichiometric Dianhydride)

BPDA (14.414 g) and DMAC (175 ml) were mixed together to form a slurry (solubility of BPDA is very low in DMAC). With stirring, PA (0.296 g) was added to the slurry and then APB-134(14.617 g) was added to the stirred slurry. The resulting mixture was stirred overnight at ambient temperature to afford a BPDA/APB-134/PA polyamic acid solution, which was established to have the following characteristic; $\eta_{inh}$=0.86 g/dL.

The above polyamic acid solution was chemically imidized to BPDA/APB-134 homopolyimide endcapped with PA using the procedure which follows. To the above polyamic acid solution were added with stirring TEA (0.72 ml) and AA (1.08 ml), and the resulting mixture was stirred at 30° C. for 18 hours with gellation being noted of the sample after about 1 hour at 30° C. The resulting polyimide was isolated in methanol in a Waring blender using a ratio of approximately 10 g of polymer solution to 500 ml of methanol. An additional Waring blender treatment with 500 ml of methanol was done after filtration before drying at 200° C. under nitrogen and vacuum to constant weight.

The resulting polyimide was characterized by DSC using the following methodology. The DSC testing was done with three heat scans from ambient temperature to at least 410° C. with a subsequent cooling scan between each heat scan. Glass transition temperature ($T_g$), crystallization temperature ($T_c$), and melting temperature ($T_m$) were determined for each scan. The crystallization temperature was taken to be the peak of the DSC output for the crystallization transition and the melting temperature was taken to be the peak of the DSC output for the melting transition. For this BPDA/RODA homopolyimide, the measured $T_m$ was 403° C. for the second heat and 404° C. for the first heat. The measured $T_g$s were 200° C. ($2^{nd}$ heat) and 218° C. ($3^{rd}$ heat) and the $T_c$ ($2^{nd}$ heat) was measured as 222° C. The observed melting point is considered too high for a melt-processible polyimide.

Example 16 (Prophetic)

Preparation of Polyimide Based on BPDA/PMDA/APB-134/PA 80.75/14.25/100/10 (All are Molar Parts)—(85/15 BPDA/PMDA Molar Ratio)—(95% of Stoichiometric Dianhydride) Via Melt Polymerization Monomer ingredients (as indicated above) are individually fed from four separate loss-in-weight feeders via an inlet opening into a Berstorff (ZE-25) (25 mm) twin-screw extruder. The powdered monomer ingredients are continuously fed concurrently as a mixture in relative amounts of 100 moles of 1,3-bis(4-aminophenoxy) benzene (APB-134), 80.75 moles of 3,4,3',4'-biphenyltetracarboxylic dianhydride (BPDA), 14.25 moles of pyromellitic dianhydride (PMDA), and 10 moles of phthalic anhydride (PA) through an inlet opening into the first barrel zone of the twin-screw extruder maintained at 15° C. by circulating cooling water. The screws are continuously turning at 100 RPM. The reaction mixture is conveyed through the cooled first zone and the next three barrel zones maintained at temperatures of 105° C., 150° C. and 200° C., respectively. The reaction mixture then continues moving through the extruder on through a fifth zone having an opening in the upper section of the wall and maintained at a temperature of 250° C., where water of reaction is continuously removed through the opening provided. The reaction mixture is then further conveyed through zone number six that is maintained at 300° C., and on through zone seven at 340° C. where a second opening in the upper section of the wall provides for removal of additional water of reaction and/or initial bubbles that may have been formed in the mixture. The reaction mixture is then further conveyed through zone number eight that is maintained at 350° C., and on through zone nine at 350° C. with a fourth opening in the upper section of the wall where the final amount of water of reaction and/or bubbles that may have been formed in the mixture is removed. A tenth zone is maintained at 350° C. then leads to a die discharge where the polyimide product is continuously extruded.

The resulting polyimide is characterized by DSC and exhibits a melting point within the range of 350–385° C. during the first heat scan, a crystallization exotherm upon the subsequent cooling within the range of 250–300° C., and a melting point within the range of 350–385° C. during the subsequent reheat indicating recoverable crystallinity from the melt.

What is claimed is:

1. A melt-processible, thermoplastic copolyimide comprising a reaction product of components comprising:

(I) an aromatic dianhydride component consisting essentially of 3,3',4,4'-biphenyltetracarboxylic dianhydride (BPDA) and pyromellitic dianhydride (PMDA) in combination;

(II) an aromatic diamine component selected from the group consisting of 1,3-bis(4-aminophenoxy)benzene (APB-134); 3,4'-oxydianiline (3,4'-ODA); 3,4'-oxydianiline (3,4'-ODA) and 4,4'-oxydianiline (4,4'-ODA) in combination; 3,4'-oxydianiline (3,4'-ODA) and 1,4-diaminobenzene (PPD) in combination; 1,3-bis(4-aminophenoxy)benzene (APB-134) and 4,4'-oxydianiline (4,4'-ODA) in combination; and 1,3-bis(4-aminophenoxy)benzene (APB-134) and 1,4-diaminobenzene (PPD) in combination; and (III) an endcapping component;

wherein the copolyimide has a stoichiometry in the range from 93% to 98%, has a molar ratio of 3,3',4,4'-biphenyltetracarboxylic dianhydride/pyromellitic dianhydride (BPDA/PMDA) of greater than or equal to 70/30 but less than or equal to 95/5, exhibits a melting point in the range of 330° C. to 385° C., and exhibits recoverable crystallinity as determined by differential scanning calorimetry analysis.

2. The copolyimide of claim 1 wherein the aromatic diamine component is 3,4'-oxydianiline (3,4'-ODA), and the molar ratio of 3,3',4,4'-biphenyltetracarboxylic dianhydride/pyromellitic dianhydride (BPDA/PMDA) is in the range from 75/25 to 90/10.

3. The copolyimide of claim 2 wherein the molar ratio of 3,3',4,4'-biphenyltetracarboxylic dianhydride/pyromellitic dianhydride (BPDA/PMDA) is in the range from 80/20 to 90/10.

4. The copolyimide of claim 1 wherein the aromatic diamine component is 1,3-bis(4-aminophenoxy)benzene (APB-134), and the molar ratio of 3,3',4,4'-biphenyltetracarboxylic dianhydride/pyromellitic dianhydride (BPDA/PMDA) is in the range from 75/25 to 90/10.

5. The copolyimide of claim 4 wherein the molar ratio of 3,3',4,4'-biphenyltetracarboxylic dianhydride/pyromellitic dianhydride (BPDA/PMDA) is in the range from 80/20 to 90/10.

6. The copolyimide of claim 1 wherein the aromatic diamine component is 3,4'-oxydianiline (3,4'-ODA) and 4,4'-oxydianiline (4,4'-ODA) in combination and the molar ratio of 3,4'-ODA/4,4'-ODA is in the range from 75/25 to 95/5.

7. The copolyimide of claim 6 wherein the molar ratio of BPDA/PMDA is greater than or equal to 75/25 and the molar ratio of 3,4'-ODA/4,4'-ODA is greater than or equal to 80/20.

8. The copolyimide of claim 1 wherein the aromatic diamine component is 3,4'-oxydianiline (3,4'-ODA) and 1,4-diaminobenzene (PPD) in combination, the molar ratio of BPDA/PMDA is in the range from 75/25 to 90/10.

9. The copolyimide of claim 8 wherein the molar ratio of 3,4'-ODA/PPD is in the range from 90/10 to 95/5.

10. The copolyimide of claim 1 wherein the aromatic diamine component is 1,3-bis(4-aminophenoxy)benzene (APB-134) and 4,4'-oxydianiline (4,4'-ODA) in combination and the molar ratio of APB-134/4,4'-ODA is in the range from 85/15 to 95/5.

11. The copolyimide of claim 10 wherein the molar ratio of BPDA/PMDA is in the range from 75/25 to 90/10.

12. The copolyimide of claim 1 wherein the aromatic diamine component is 1,3-bis(4-aminophenoxy)benzene (APB-134) and 1,4-diaminobenzene (PPD) in combination and the molar ratio of APB-134/PPD is in the range from 90/10 to 95/5.

13. The copolyimide of claim 12 wherein the molar ratio of BPDA/PMDA is in the range from 75/25 to 90/10.

14. The copolyimide of claim 1 wherein the reaction product is obtained by solution polymerization.

15. The copolyimide of claim 1 wherein the reaction product is obtained by melt polymerization.

16. A method of preparing a melt-processible polyimide composition by melt polymerization comprising the steps of:

(a) blending, to substantial homogeneity, components comprising:
  (I) 93 to 98 mole parts of an aromatic dianhydride component consisting essentially of 3,3',4,4'-biphenyltetracarboxylic dianhydride (BPDA) and pyromellitic dianhydride (PMDA) in combination;
  (II) 100 mole parts of an aromatic diamine component selected from the group consisting of 1,3-bis(4-aminophenoxy)benzene (APB-134), 3,4'-oxydianiline (3,4'-ODA); 3,4'-oxydianiline (3,4'-ODA) and 4,4'-oxydianiline (4,4'-ODA) in combination; 3,4'-oxydianiline (3,4'-ODA) and 1,4-diaminobenzene (PPD) in combination; 1,3-bis(4-aminophenoxy)benzene (APB-134) and 4,4'-oxydianiline (4,4'-ODA) in combination; and 1,3-bis(4-aminophenoxy)benzene (APB-134) and 1,4-diaminobenzene (PPD) in combination; and
  (III) 4 to 14 mole parts of at least one endcapping component;
wherein the dianhydride component has either a molar ratio of 3,3',4,4'-biphenyltetracarboxylic dianhydride/pyromellitic dianhydride (BPDA/PMDA) of greater than or equal to 70/30 but less than or equal to 95/5;
the components (I), (II) and (III) being in substantially solventless form and the blending step producing a substantially solventless component blend;
the blending step being carried out at a temperature below the melting point of any of components (I), (II) and (III);
the component (I) and (II) being present in the component blend in a molar ratio of (I):(II) from 0.93 to 0.98;
the component (III) being present in the component blend in a molar ratio (III):(II) of 0.04 to 0.14;

(b) heating the substantially solventless component blend produced in step (a) to a predetermined melt processing temperature at which the (I) aromatic dianhydride component and the (II) aromatic diamine component are melted and will react to form a melt of a polyimide; the predetermined melt processing temperature being less than the temperature at which the polyimide melt chemically decomposes;

(c) mixing the component blend and the polyimide melt produced therefrom during said heating step (b);

(d) removing water of reaction from the component blend and the polyimide melt produced therefrom during the heating step (b);

(e) forming the polyimide melt into an article having predetermined shape; and (f) cooling the article having predetermined shape to ambient temperature;

wherein the polyimide exhibits a melting point in the range of 330° C. to 385° C. and the polyimide exhibits recoverable crystallinity as determined by DSC analysis.

17. The process of claim 16 wherein the aromatic diamine component is 3,4'-oxydianiline (3,4'-ODA), and the molar ratio of 3,3',4,4'-biphenyltetra-carboxylic dianhydride/pyromellitic dianhydride (BPDA/PMDA) is in the range from 75/25 to 90/10.

18. The process of claim 16 wherein the aromatic diamine component is 3,4'-oxydianiline (3,4'-ODA) and 4,4'-oxydianiline (4,4'-ODA) in combination, and the molar ratio of 3,3',4,4'-biphenyltetracarboxylic dianhydride/ pyromellitic dianhydride (BPDA/PMDA) is greater than or equal to 75/25.

19. The process of claim 16 wherein the aromatic diamine component is 3,4'-oxydianiline (3,4'-ODA) and 1,4-diaminobenzene (PPD) in combination, and the molar ratio of 3,3',4,4'-biphenyltetracarboxylic dianhydride/ pyromellitic dianhydride (BPDA/PMDA) is in the range from 75/25 to 90/10.

20. The process of claim 16 wherein the endcapping component is selected from the group consisting of phthalic anhydride, naphthalic anhydride, and aniline.

21. The process of claim 16 wherein the article having predetermined shape is selected from the group consisting of a film, a fiber, an extrudate, a pellet, a compression-molded article, and a blow-molded article.

22. The process of claim 16 wherein the steps (a)–(e) are carried out in an extruder.

23. The process of claim 22 wherein the extruder contains sequential zones 1 through x, where x is about 2 to about 10, the component blend and the polyimide melt produced therefrom being passed through the sequential zones, each of the zones being heated to a temperature less than the predetermined melt processing temperature, the blending step (a) being carried out in zone 1 at a temperature which is less than the melting temperature of each of the components (I), (II), and (III).

* * * * *